July 18, 1944.    N. J. RITZERT    2,354,062
METHOD OF MAKING BELTS
Filed March 13, 1941

INVENTOR
NORMAN J. RITZERT
by
ATTORNEYS

Patented July 18, 1944

2,354,062

UNITED STATES PATENT OFFICE 2,354,062

METHOD OF MAKING BELTS

Norman J. Ritzert, Dayton, Ohio, assignor to The Dayton Rubber Manufacturing Company, Dayton, Ohio, a corporation of Ohio Application March 13, 1941, Serial No. 383,194

4 Claims. (Cl. 154—4)

My invention relates to belts, and more particularly to an improved method of making belts, which are adapted to be cut to the desired length and the ends suitably fastened together to provide an endless belt.

It is the principal object of this invention to devise a method of making trapezoidal shaped belts in long lengths which can be cut to provide one or more belts of the desired length.

Another object is to devise a method of making belts of the V-type wherein the belt body is built up on a mandrel which is cut to form a single long length belt of the desired cross sectional shape. This can be further cut up into suitable length belts and the ends of the individual belts joined together by a connector or other suitable means to form an endless belt.

Another object of this invention is to provide a method of forming long continuous length belting of the desired cross sectional shape by building up the belt body on the surface of a drum or mandrel and spirally cutting the belt body from the mandrel to produce a long length belt.

These and other objects and advantages will appear from the following description taken in connection with the drawing, wherein in Figure 1 there is diagrammatically illustrated the method of spirally cutting the built-up belt body from the mandrel to form a long length belting of the V-belt type;

Figure 1:
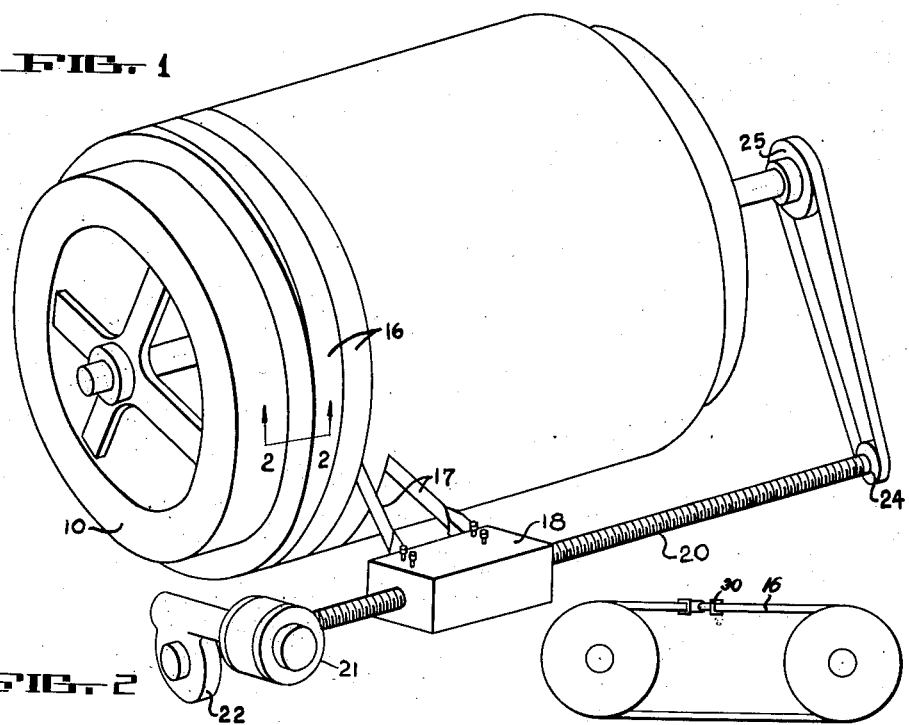

Referring to the drawing in detail, there is shown for purposes of illustration a method of making a V-belt according to my invention but it will be understood that other suitable processes may be used.

Figure 2:
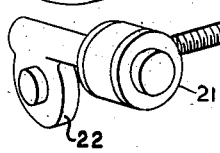
Figure 2 is a fragmentary enlarged sectional view taken substantially on the line 2—2 of Figure 1.
Figure 6:
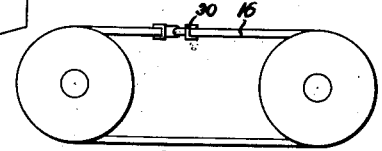
Figure 6 is similar to Figure 5 showing the method of uniting the ends of the belt by a suitable connector to form an endless belt.
Figure 3:
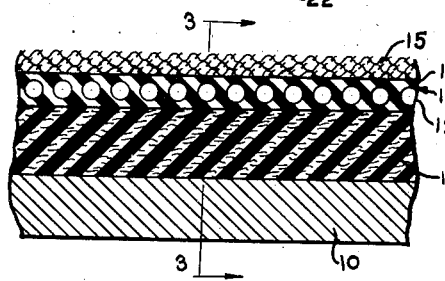
Figure 3 is a similar fragmentary sectional view taken on the line 3—3 of Figure 2.
Figure 3:
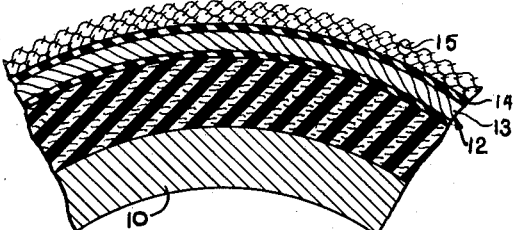
Figure 5:
Figure 5 illustrates a typical example of a finished belt made according to this invention and adapted for use with a belt connector.

As illustrated in Figures 1, 2 and 3 the belt body is formed by applying layers of rubber composition and cord onto a suitable mandrel or drum surface, as indicated at 10. As shown, a rubber composition layer 11, such as "Stiflex," is applied on the surface of the drum 10 forming the compression section of the belt. Over this compression section layer, which is of suitable thickness, there is applied a neutral axis layer 12, which comprises cords 13 embedded in rubber 14. The cords comprise a continuous length cord which preferably is spirally wound on and embedded in the rubber layer 14. Over the cord layer is wound a rubberized fabric layer 15 to form the outer tension section of the belt. This layer is preferably convolutely wound around the built-up belt body a suitable number of times to form a belt having the desired number of plies in the tension section. Thereafter, the belt is spirally cut from the mandrel, as illustrated in Figure 1, to provide a long length belting 16, as shown in Figure 5. To effect this, knives 17 are suitably held in a movable holder 18 and simultaneously moved axially of the drum 10 while the drum is rotated. Suitable means for doing this is shown in Figure 1 wherein the knife holder 18 is carried on a threaded rod 20 which is rotated by means of a motor 21 through the worm gear mechanism 22. The knives 17 are set at a proper angle and moved axially of the drum at a rate relative to the speed of rotation of the drum so as to produce a belting of the desired width and shape. The knives are inclined and moved across the face of the drum at a uniform rate in order to cut a V-shaped belt of the desired width. Moreover, the diverging angle setting of the knives is such as to produce a belt of V-shaped cross section.

As shown in Figure 1, the threaded rod 20 is provided with a drive pulley 24 and at one end is arranged to drive the pulley 25 to rotate the drum. It will be understood that other suitable mechanism may be utilized, and, if desired, the drum may be rotated and arranged to drive the threaded rod 20 for moving the knives 17 axially of the drum.

Figure 4:
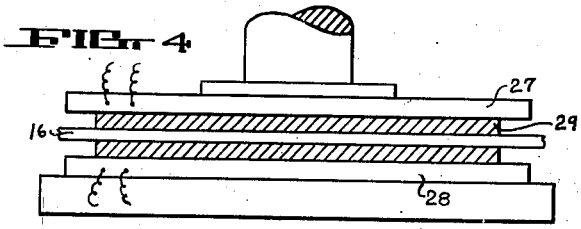
Figure 4 illustrates diagrammatically the method of curing the rubber belting after it is cut from the mandrel.

When the belt has been cut from the drum it is then placed in suitable molds and cured to form the finished product. This may be accomplished by placing the cut belt in a mold, such as indicated in Figure 4. As shown, the mold comprises halves 27 and 28 which preferably comprise the dies 29 which are shaped to conform with the sides of the belt and are suitably heated by electrical or other suitable means. Preferably the belt is cured after it is cut and removed from the surface of the drum or mandrel but it may be cured while on the mandrel and subsequently cut to form the finished belt. If desired, the belt may be cured in different sections by passing the same through the press mold as illustrated in Figure 4. A ring mold may be used when the length of the belting, as cut from the mandrel, is of a feasible length to handle, otherwise the belt can be vulcanized or cured in different sections. In use, the belt made according to my invention, is adapted to be cut to the desired length to provide one or more belts and the ends joined together by a suitable belt connector, such as indicated at 30.

It will be understood that in practicing my process of forming a long length belting, the particular belt body structure may be varied, as desired, to produce a belt having the required characteristics. Further, the term "rubber," includes synthetic rubber or equivalent moldable resinous material. Also, in place of "Stiflex" I may use other rubber compositions or synthetic resinous material with or without reinforcing fibers.

It will be further understood that my invention is not to be limited to the exact method herein described but may be modified as becomes necessary to adapt it to varying conditions and uses within the scope of the claims and this invention.

Having thus fully described my invention, what I claim as new and desire to secure by Letters Patent is:

1. A process of making a belt of the desired trapezoidal cross sectional shape comprising building up the belt body on the surface of a drum-like mandrel, cutting the belt body along diverging angles spirally of said mandrel to form a long length belt, curing said cut belt, severing said cured belt to the desired length, and attaching the ends of said belt with a belt connector to provide an endless belt.

2. The method of making a belt which comprises placing on the surface of a mandrel a compression section consisting of at least one layer of fiber reinforced rubber composition, placing thereover a neutral axis section consisting of cords parallelly disposed and embedded in rubber composition, superimposing thereon at least one layer of rubberized fabric forming an outer cover and tension section, severing the superimposed layers spirally of said mandrel at diverging angles to form a V-shaped belt of the desired width, removing the belt from the mandrel, and curing the belt to provide a finished V-type belt.

3. A process of making a belt comprising the steps of forming the belt body on a drumlike mandrel surface, and rotating said mandrel while cutting the belt therefrom along diverging angles and spirally across the face of said mandrel to form a single long length belt having the desired cross sectional shape.

4. The method of making a belt comprising superimposing on the surface of a mandrel layers of rubberized material comprising compression, neutral axis, and tension sections, severing the superimposed layers along diverging angles spirally around said mandrel to form a long length belt of trapezoidal cross section, removing the belt from the mandrel, and curing the belt to provide a finished V-type belt.

NORMAN J. RITZERT.